US010171253B2

(12) United States Patent
Kalkunte (10) Patent No.: US 10,171,253 B2
(45) Date of Patent: *Jan. 1, 2019

(54) NODE DIRECTED MULTICAST TRAFFIC MANAGEMENT SYSTEMS AND METHODS FOR MESH NETWORKS

(71) Applicant: Vivint, Inc., Provo, UT (US)

(72) Inventor: Venkat Kalkunte, Saratoga, CA (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,945

(22) Filed: Jul. 17, 2017

(65) Prior Publication Data

US 2018/0013573 A1    Jan. 11, 2018

Related U.S. Application Data

(63) Continuation of application No. 14/642,399, filed on Mar. 9, 2015, now Pat. No. 9,712,332.

(60) Provisional application No. 61/951,158, filed on Mar. 11, 2014.

(51) Int. Cl.
| | |
|---|---|
| *H04L 12/761* | (2013.01) |
| *H04L 12/18* | (2006.01) |
| *H04L 12/24* | (2006.01) |
| *H04L 12/26* | (2006.01) |
| *H04L 12/841* | (2013.01) |

(52) U.S. Cl.
CPC .............. *H04L 12/18* (2013.01); *H04L 41/08* (2013.01); *H04L 41/0816* (2013.01); *H04L 43/028* (2013.01); *H04L 43/08* (2013.01); *H04L 47/286* (2013.01)

(58) Field of Classification Search
CPC ............................ H04L 45/16; H04W 84/18
See application file for complete search history.

(56) References Cited

U.S. PATENT DOCUMENTS

| | | |
|---|---|---|
| 7,269,157 B2 | 9/2007 | Klinker et al. |
| 8,248,949 B2 | 8/2012 | Ozer et al. |
| 8,284,775 B2 | 10/2012 | Chu et al. |

(Continued)

FOREIGN PATENT DOCUMENTS

KR    1020100042516 A    4/2010

OTHER PUBLICATIONS

International Search Report and Written Opinion of the International Searching Authority for PCT/US2015/019735.

(Continued)

*Primary Examiner* — Shukri Taha
(74) *Attorney, Agent, or Firm* — Holland & Hart, LLP (57) ABSTRACT

Systems and related methods include node directed management of multicast traffic within a wireless mesh network. A wireless mesh network may include a plurality of mesh nodes and a central server in communication with at least one of the mesh nodes of the plurality of mesh nodes. The central server may be configured to generate one or more rules for at least one of the mesh nodes to instruct a change in a pre-routing parameter in a packet header based on received channel state information. The central server may include a rules-based engine configured to generate and convey one or more traffic shaping rules in response to sensing traffic conditions. The position of received multicast packets in a packet order may be modified.

20 Claims, 8 Drawing Sheets

(56) References Cited

U.S. PATENT DOCUMENTS

| | | |
|---|---|---|
| 8,516,117 B2 | 8/2013 | Munger et al. |
| 8,885,519 B2 | 11/2014 | Aguirre et al. |
| 2005/0036500 A1 | 2/2005 | Rodeheffer et al. |
| 2006/0039385 A1 | 2/2006 | Bare et al. |
| 2008/0095059 A1 | 4/2008 | Chu |
| 2008/0095163 A1 | 4/2008 | Chen et al. |
| 2008/0137556 A1 | 6/2008 | Park et al. |
| 2009/0003207 A1 | 1/2009 | Elliott |
| 2009/0046614 A1 | 2/2009 | Lewis et al. |
| 2010/0008261 A1 | 1/2010 | Javaid et al. |
| 2010/0074141 A1 | 3/2010 | Nguyen |
| 2010/0228980 A1 | 9/2010 | Falk et al. |
| 2011/0280123 A1 | 11/2011 | Wijnands et al. |
| 2012/0008527 A1 | 1/2012 | Le et al. |
| 2012/0110537 A1 | 5/2012 | Vedantam et al. |
| 2013/0051250 A1* | 2/2013 | Shaffer .................. H04L 45/22 370/252 |
| 2013/0121331 A1 | 5/2013 | Vasseur et al. |
| 2013/0170335 A1 | 7/2013 | Pace et al. |
| 2013/0188562 A1 | 7/2013 | Espina Perez et al. |
| 2013/0272217 A1 | 10/2013 | Negus et al. |
| 2015/0188808 A1 | 7/2015 | Ghanwani et al. |
| 2015/0270882 A1 | 9/2015 | Shattil |

OTHER PUBLICATIONS

International Search Report for PCT/US2014/024846, dated Apr. 12, 2014.
English machine translation of KR1020100042516, Apr. 26, 2010.

* cited by examiner

NODE DIRECTED MULTICAST TRAFFIC MANAGEMENT SYSTEMS AND METHODS FOR MESH NETWORKS

CROSS REFERENCE TO RELATED APPLICATIONS

This application is a continuation application of U.S. patent application Ser. No. 14/642,399 entitled "NODE DIRECTED MULTICAST TRAFFIC MANAGEMENT SYSTEMS AND METHODS FOR MESH NETWORKS," which was filed 9 Mar. 2015, which claims priority from U.S. Provisional Patent Application No. 61/951,158 entitled "NODE DIRECTED MULTICAST TRAFFIC MANAGEMENT SYSTEMS AND METHODS FOR MESH NETWORKS," which was filed 11 Mar. 2014, and assigned to the assignee hereof.

BACKGROUND

Internet Protocol (IP) multicast is a routing technique that allows IP traffic to be sent from one source or multiple sources and delivered to multiple destinations. Instead of sending individual packets to each destination, a single packet is sent to a multicast group, which is identified by a single IP destination group address. IP multicast routing protocols use a time-to-live (TTL) parameter to decide how "far" from a sending host a given multicast packet should be forwarded (i.e., a number of hops). The default TTL value for multicast within a wireless mesh network is one (1), thus resulting in a multicast packet being forwarded one (1) hop, which may be insufficient.

SUMMARY

The present disclosure relates generally to wireless mesh networks, and more particularly to node directed multicast routing within wireless mesh networks. In certain embodiments, a wireless mesh network includes a plurality of mesh nodes and a central server in communication with each mesh node of the plurality. The central server may be configured to generate one or more rules for each mesh node of the plurality. The one or more rules may instruct the mesh node to change in a pre-routing parameter in a packet header of a multicast packet received at a mesh node during a multicast operation based, at least in part, on channel state information received at the mesh node. More specifically, according to one embodiment, the central server (i.e., network controller) includes a rules-based engine configured to generate one or more rules, for each mesh node of a wireless mesh network, to manage multicast traffic within the wireless mesh network. In certain implementations, the central server is further configured to convey the one or more rules to the one or more mesh nodes. The central server may also be configured to sense traffic. In some cases, the channel state information includes a noise floor value.

In some instances, the central server includes a multicast daemon configured to convey one or more rules to the one or more mesh nodes. A mesh node may implement a Netfilter packet filtering framework, the Netfilter framework configured to forward or drop one or more received packets based on one or more rules. In certain cases, the pre-routing parameter is a time-to-live (TTL) parameter. In some instances, the one or more rules instruct the one or more mesh nodes to adjust the TTL parameter within the wireless mesh route.

In some embodiments, the wireless mesh network node includes a receiver, a packet encoding and packet decoding engine, a rule insertion engine, and a channel state detection engine. In certain instances, the rules insertion engine is further configured to insert one or more rules that instruct the mesh node to adjust a pre-routing parameter. In some implementations, the channel state detection engine is further configured to determine a noise floor value. In certain cases, adjusting the pre-routing parameter is based, at least in part, on a detected channel state.

Of course, methods of operating a system are also within the scope of the present invention. Such a method may include, at a wireless mesh node, receiving one or more rules, receiving channel state information, determining a pre-routing parameter value based, at least in part, on the received channel state information, and setting a pre-routing parameter of a received multicast packet to the pre-routing parameter value. In some instances, receiving the one or more rules includes receiving the one or more rules from a central controller. In certain cases, modifying the pre-routing parameter includes modifying a time-to-live (TTL) parameter in at least one wireless mesh route during the multicast operation. In some embodiments, receiving channel state information includes receiving a noise floor value. In certain cases, the method includes the additional step of modifying the position of a received multicast packet in a packet ordering of multiple received multicast packets.

Yet other embodiments of the present invention comprise computer-readable media storage storing instructions that when executed by a processor cause the processor to perform instructions in accordance with one or more embodiments described herein.

Other aspects, as well as features and advantages of various aspects, of the present invention will become apparent to those of skill in the art though consideration of the ensuing description, the accompanying drawings and the appended claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Referring in general to the accompanying drawings, various embodiments of the present invention are illustrated to show the structure and methods for installing a component within a system, such as a security system. Common elements of the illustrated embodiments are designated with like numerals. It should be understood that the figures presented are not meant to be illustrative of actual views of any particular portion of the actual device structure, but are merely schematic representations that are employed to more clearly and fully depict embodiments of the invention.

The following provides a more detailed description of the present invention and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

As will be appreciated by a person having ordinary skill in the art, several routing protocols may be used to discover multicast groups and to build routes for each multicast group. These routing protocols may include, for example, Protocol-Independent Multicast (PIM), Distance-Vector Multicast Routing Protocol (DVMRP), Multicast Open Shortest Path First (MOSPF), Internet Group Management Protocol (IGMP), Multicast BGP (MBGP), Multicast Source Discovery Protocol (MSDP), Multicast Listener Discovery (MLD), and GARP Multicast Registration Protocol (GMRP).

The Distance-Vector Multicast Routing Protocol (DVMRP) is based on the routing information protocol and may be found implemented on IP networks where routing protocols to support multicast are absent. DVMRP uses a reverse path flooding approach, transmitting received packets along all paths. It is generally understood that DVMRP suffers from network scaling issues, due in part to the flooding approach in implementations lacking pruning mechanisms. DVMRP's flat unicast routing mechanism also affects its capability to scale. In some DVMRP implementations, routers occasionally re-flood a network based on one or more algorithms, such as those that account for flooding frequency, data stream delivery time, and the like.

Protocol-Independent Multicast (PIM) includes four variant modes of behavior: PIM sparse mode, PIM dense mode, bidirectional PIM, and PIM source-specific multicast, with PIM sparse mode and PIM dense mode being the most commonly implemented. The PIM dense mode uses a process of reverse path flooding that is similar to the DVMRP. Unlike DVMRP, PIM dense mode is not concerned with the presence or absence of any particular unicast protocol determining which interface provides a path back to the data stream source. As the name implies, unlike DVMRP, which uses its own protocol, PIM is protocol independent.

PIM sparse mode is optimized for internetworks with sparsely distributed multicast groups. PIM sparse mode uses multicast distribution trees rooted at a rendezvous point that is then used as a registration point for packet routing. In order to receive multicast data, routers explicitly indicate to their upstream neighbors of their interest in particular groups and particular sources. Routers use PIM Join and Prune messages to join and leave multicast distribution trees. This allows the packets in a given data stream to move from the sender, through the rendezvous point, and ultimately on to the receiver. Routers in the path optimize the number of hops in the path during the multicast.

The Multicast Open Shortest Path First (MOSPF) is an extension of Open Shortest Path First (OSPF). MOSPF generally may facilitate interoperation between unicast and multicast routers, and was designed such that it is generally backwards compatible with non-OSPF unicast routers. In general, MOSPF employs a unicast routing protocol that requires each router in a network to be aware of all available links. A MOSPF router calculates routes from a source to all possible group members for a particular multicast group. MOSPF routers generally include multicast information in OSPF link state advertisements, enabling the router to identify active multicast groups and their associated local area networks. MOSPF routers generate a distribution tree for each multicast source, each group, and each sending source. The routes for each source/multicast group pair are calculated. Each time a link state changes, or if the cache times out, MOSPF will recalculate the topology.

Figure 1:
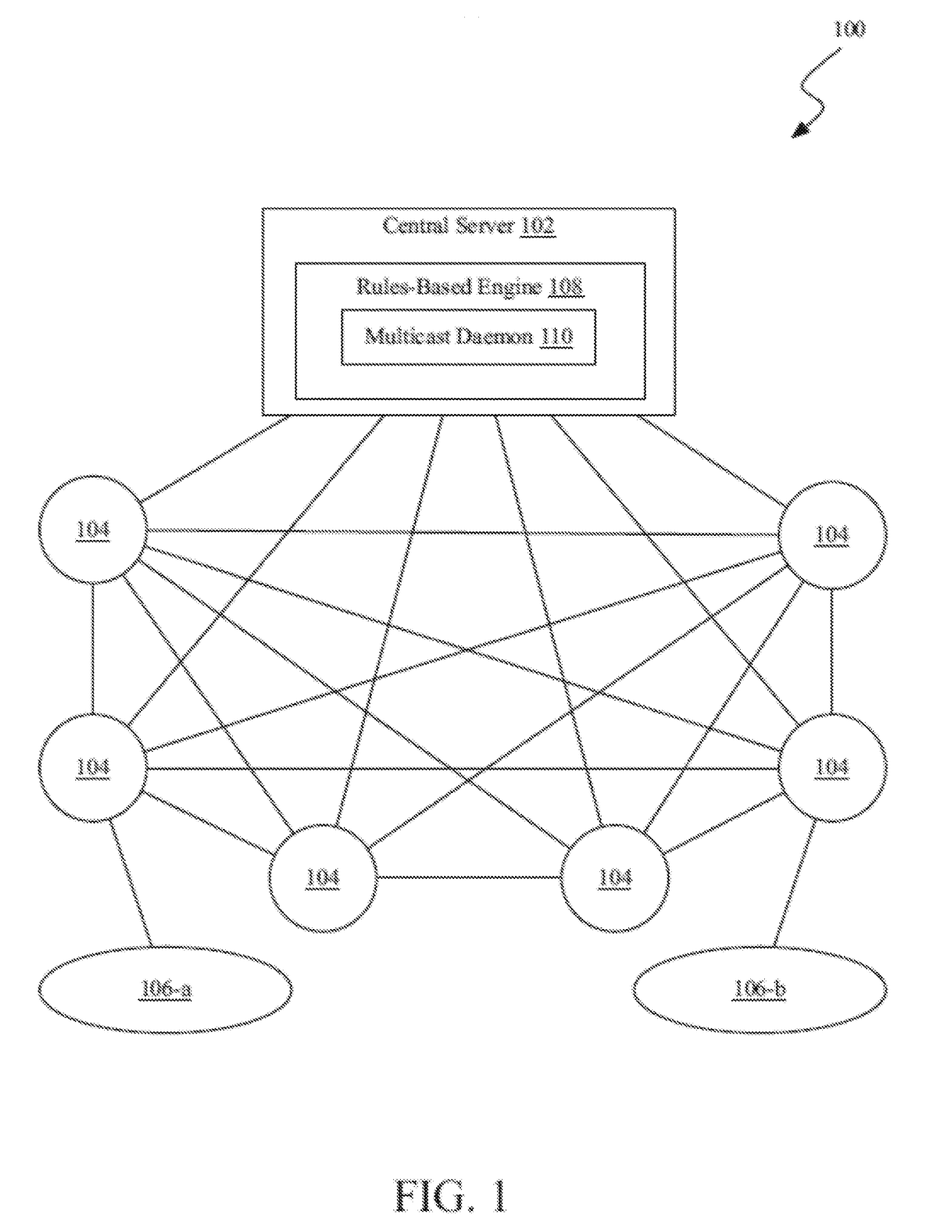
FIG. 1 is a mesh network deployed multicast traffic management system including a plurality of mesh nodes and a central controller.

Referring now to FIG. 1, a mesh network deployed multicast traffic management system 100 includes a central server 102 (i.e., a management server), a plurality of mesh nodes 104, and a plurality of destinations 106. Central server 102, which may also be referred to as a "management server" or a "central controller," may include a rules-based engine 108 and may be communicatively coupled to all mesh nodes 104 within a wireless mesh network. In some implementations, the rules-based engine 108 may include a multicast daemon 110, as described more fully below.

Central server 102 may be configured to sense traffic (e.g., upon manual or automatic triggers) within a mesh network and generate rules for allowing decisions, disallowing decisions, or both. The rules may be sent individually to each mesh node 104 in a routing path. The one or more rules received at a mesh node may be applied to a packet during packet processing, resulting in a change to a pre-routing parameter in the IP packet header of a received packet. For example, Netfilter hooks inside the Linux kernel may allow kernel modules to register callback functions with the network stack. A registered callback function is then called back for every packet that traverses the respective hook within the network stack. Thus, packet mangling and packet filtering mechanisms such as, for example, those included in the Netfilter framework may be used to determine whether to prevent a packet from passing (DROP) or allow it to pass (ACCEPT) based on one or more rules.

According to one example, the pre-routing parameter may consist of a time-to-live (TTL) parameter. Time-to-live (TTL) is a value in an Internet Protocol (IP) packet that tells a network router whether or not the packet has been in the network too long and should be discarded. Each router that receives a packet subtracts one from the count in the TTL attribute. When the count reaches zero, the router detecting zero discards the packet. Using a multicast IP protocol, the TTL value indicates the scope or range in which a packet may be forwarded. By convention:

0 is restricted to the same host
1 is restricted to the same subnet
32 is restricted to the same site
64 is restricted to the same region
128 is restricted to the same continent
255 is unrestricted Thus, in this example, a TTL parameter of a multicast IP packet may be adjusted at each hop within a routing path of a wireless mesh network according to a set of rules. In some instances, a multicast IP packet flows between multiple interfaces before reaching a destination. The TTL parameter for each IP packet may be adjusted at each mesh node (i.e. hop) on the mesh route. As a result, in some cases, a media player recognizes media servers without regard to whether the media player and media server are on the same sub-network or on separate sub-networks.

Rules-based engine 108 may create one or more rules for forwarding multicast traffic (i.e. IP packets) to locations in a mesh network where media "consumers" may exist. Rules-based engine 108 may be configured to recognize media "producers" and "consumers" and facilitate forwarding of multicast traffic. Once multicast flows can be recognized, the resulting unicast media traffic may be shaped accordingly to meet guarantees. In some implementations, manipulating routing tables using such technologies as, for example, a static multicast routing daemon, in combination with protocol independent multicast (PIM), an 802.11n mesh based network can obtain improved multicast performance.

Figure 2:
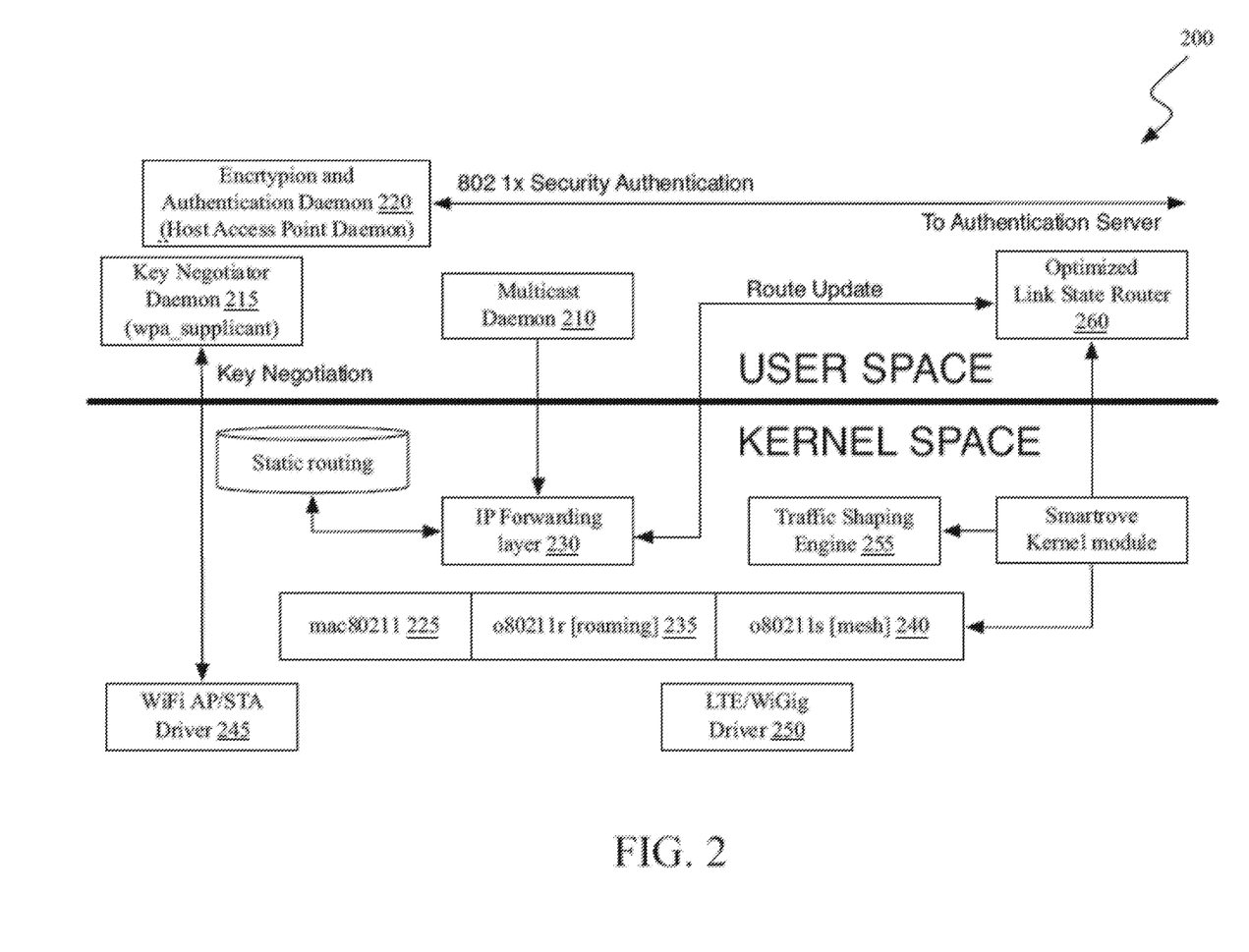
FIG. 2 is a system architecture of a mesh node of FIG. 1.

Referring now to FIG. 2, a system architecture 200 may include a multicast daemon 210, in accordance with an embodiment of the present invention. Multicast daemon 210 may be configured to enter rules in the IP forwarding layer 230. A key negotiator daemon 215 such as, for example, wpa_supplicant, may implement key negotiation with a WPA authenticator. The mac80211 subsystem 225 may move all aspects of master mode into user space. It may depend on, for example, the host access point daemon 220 handling authentication of clients, setting encryption keys, establishing key rotation policy, and other aspects of the wireless infrastructure. A network may implement the 802.11r standard 235, the 802.11s standard 240, or both, supporting fast roaming between access points and mesh networking respectively. The system may include lower level drivers such as, for example wireless AP drivers, WiFi STA drivers, or both 245, as well as, for example, LTE drivers, WiGig drivers, and the like 250. A traffic shaping engine 255 may implement one or more traffic shaping mechanisms to delay some or all datagrams as part of maintaining a desired traffic profile, thus performing rate limiting. Traffic shaping may be used to optimize or guarantee performance, improve latency, increase usable bandwidth for some kinds of packets by delaying other kinds, and the like. The system may also include an optimized link state router 260 implementing a link state routing protocol where one or more mesh nodes construct a connectivity network map. Each mesh node then may independently determine the next best logical path from the mesh node to every possible destination in the network. The collection of best paths will then form the mesh node's routing table.

An example operation of multicast traffic flow will now be described. Initially, 4 megabits per second for a multicast group from a server, such as a server located in the cloud, to a group of destinations or users may be allowed. After a certain time has elapsed, the bandwidth may be modified to a reduced level. In some embodiments, this entire sequence is converted to multicast with traffic shaping rules. The rules may enhance performance within a time period and prevent wasteful use of bandwidth. Further, the rules, which respond to detection of certain conditions and shape the traffic, can be programmatically applied from a management server such as central server 102 (e.g., see FIG. 1).

In certain embodiments, a simple management level screen, may prompt for server and client addresses resulting in a propagation of rules to individual nodes in the routed path. Once the multicast packets are flowing from the source to a destination, the unicast packets that flow may be rate controlled using techniques such as the implementation of a hierarchical token bucket (HTB) algorithm.

Figure 3:
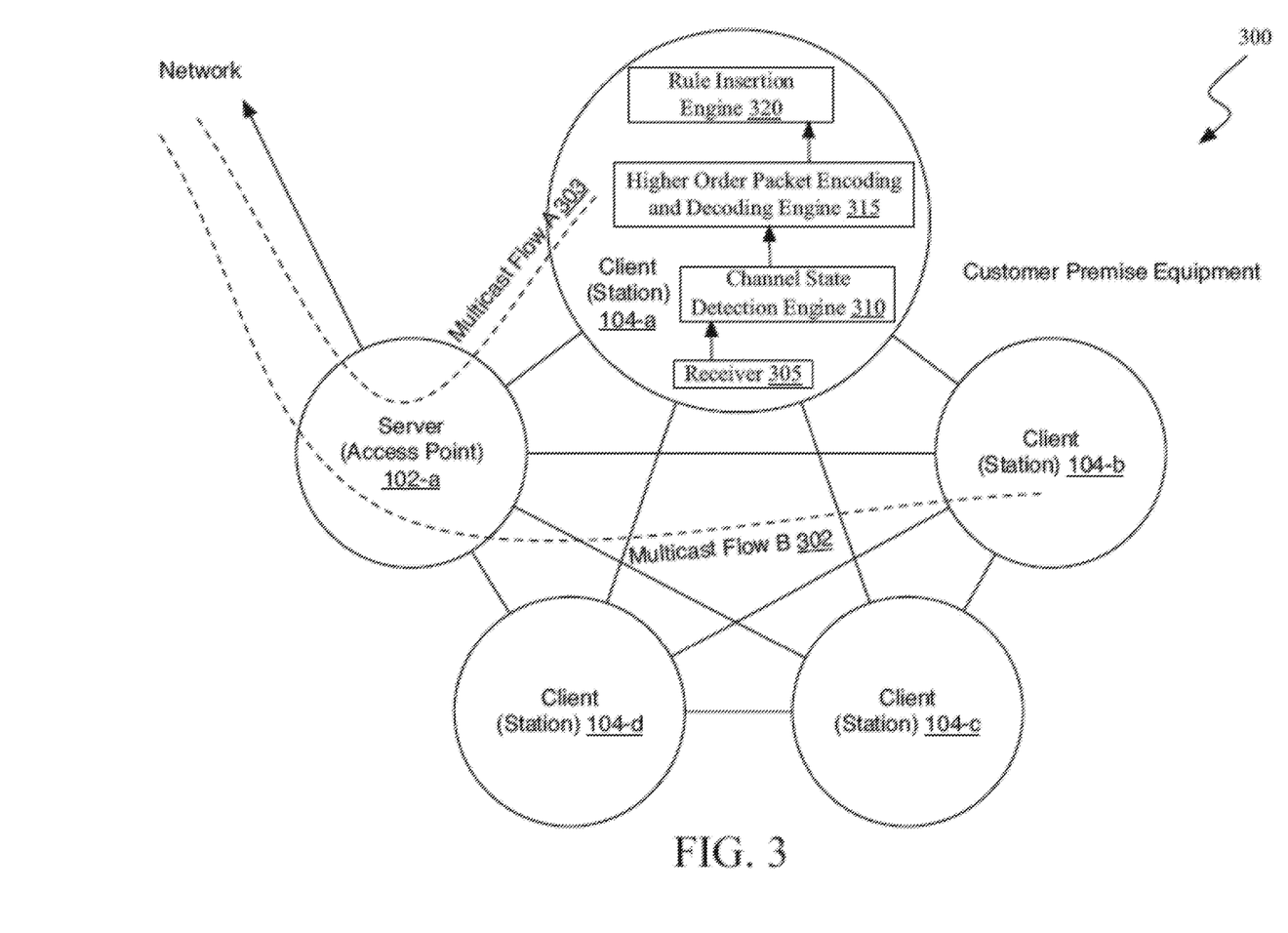
FIG. 3 is a node directed multicast traffic management system including a plurality of mesh nodes and a central controller.

Referring now to FIG. 3, in this multicast example, two multicast flows 302, 303 are transmitted on the same channel. Packets are passed through the same access point (e.g., central server 102-a) and forwarded to registered clients 104-a, 104-b (e.g., mesh nodes). Unregistered clients do not receive the forwarded packets 104-c, 104-d (e.g., mesh nodes). The mechanisms for accomplishing this distribution depends on the implemented multicast IP protocols as described previously. Client station receiver 305 receives packets from multicast flow A. In one example, there may be a high packet error rate between client 104-b and central server 102-a that may detrimentally impact the overall condition of the shared channel. For example, the noise floor may be raised as a result of the higher packet error rate. The channel state detection engine 310 detects the state of the channel shared by multicast flow A and multicast flow B. Detection of a condition that exceeds a pre-defined threshold included in a rule resident on the mesh node may trigger a rule insertion by the rule insertion engine 320, thus impacting a pre-routing parameter, such as the TTL value. In addition, in some instances, a higher order packet encoding and decoding engine may reorder packets, implementing an encoding and decoding algorithm such as a random linear network coding algorithm.

Figure 4:
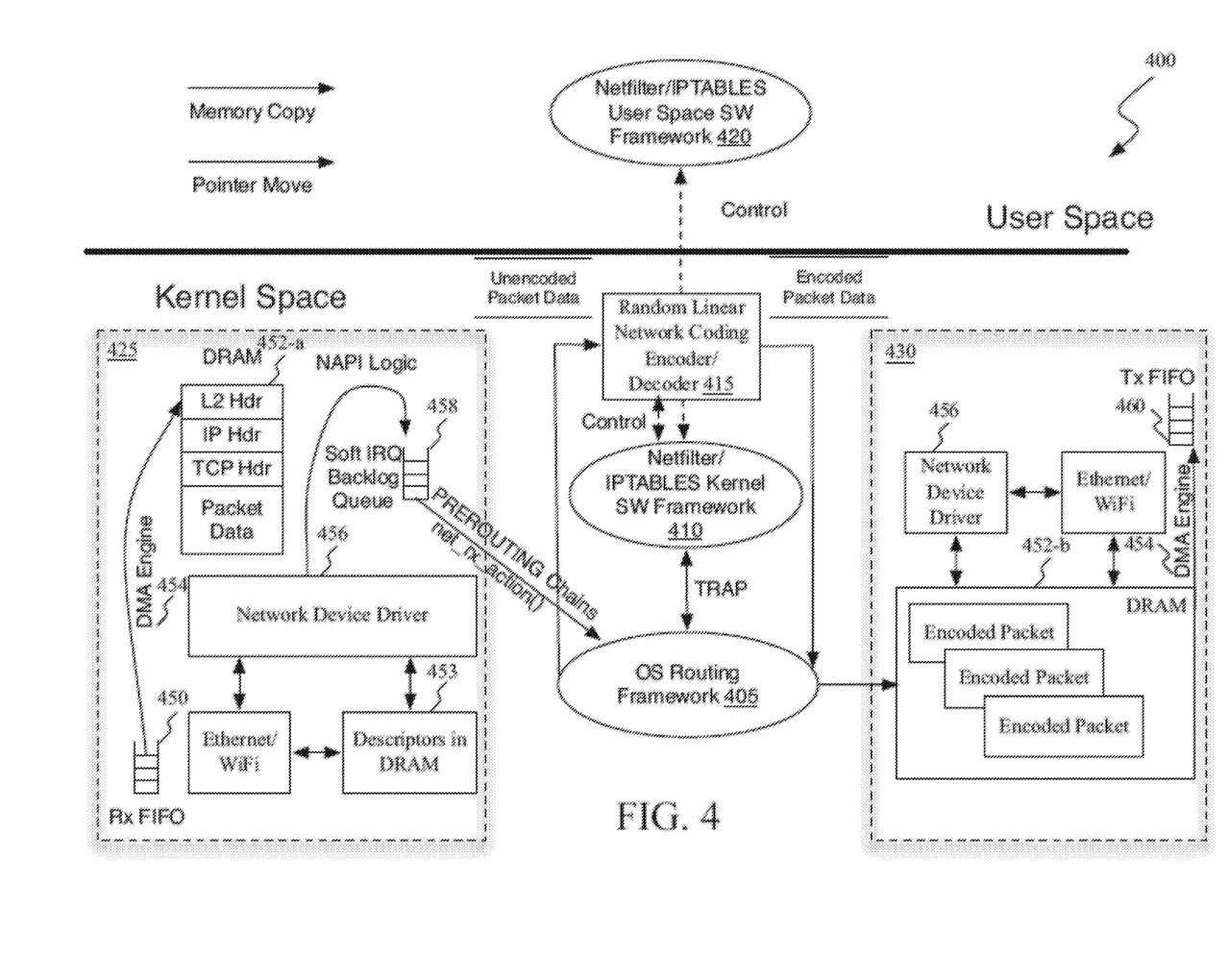
FIG. 4 is a computer system architecture and packet processing framework of a client mesh node of FIG. 3.

Referring now to FIG. 4, in some embodiments, packets of multicast flows that are encoded and decoded using a method called random linear network coding. In certain instances, encoding occurs after the adjustment of pre-routing parameters as determined by one or more rules. In some implementations, a packet filtering interface, such as, for example, IPTABLES of the Netfilter framework, may be used for rule insertion. In addition to encoding and decoding, packets may be re-ordered at each mesh node prior to transmission.

Packets are received and held at the Rx FIFO queue 450 until dequeued and written to DRAM 452-a as packet descriptors 453 by the direct memory access engine 454. A device driver packet processing framework extension such as, for example, NAPI, may be implemented in order to improve the performance of high-speed networking. These extensions may allows the network device driver 456 to run with disabled interrupts while under high traffic conditions, resulting in a decreased in system load. A NAPI-compliant network device driver 456 may also accelerate the dropping of packets in the network adaptor itself, before the kernel expends unnecessary resources.

After MAC level processing, the packets are queued in backlog queue and a SoftIRQ is scheduled 458. The SoftIRQ backlog queue 458 may be processed by triggering net_rx-_action, which process the incoming frames. It may be triggered when the network device driver 456 notifies the kernel that input frames are present. PREROUTING chains may specify address where incoming packets can be forwarded. The NF_IP_PRE_ROUTING hook is the first one that will be invoked when a packet arrives at the OS routing framework 405. It is called following sanity checks but before routing decisions are made.

In some embodiments, rule insertion and application by for example, a packet filtering mechanism such as the Netfilter framework 410, 420, packet reordering, and packet decoding by, for example, a random linear network coding encoder/decoder 415 occurs as described in further detail below. Encoded packets are placed in DRAM 452-*b*, and moved to the Tx FIFO queue 460 by the direct memory access engine 454, where they are held until dequeued and transmitted.

Figure 5:
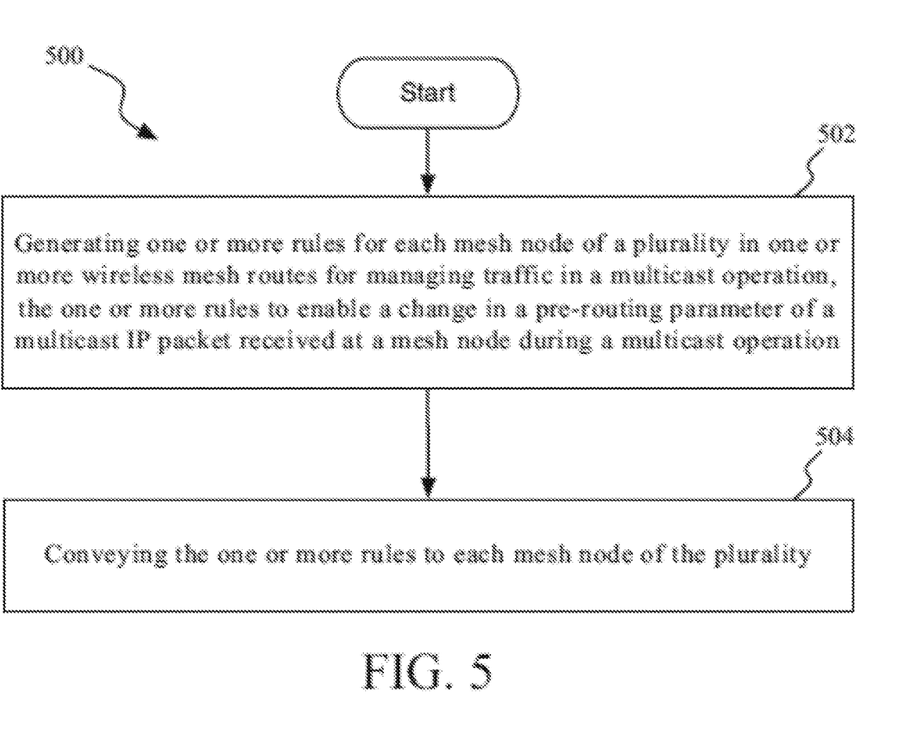
FIG. 5 is a flowchart of a method of multicast traffic management at the central controller of the multicast traffic management system of FIG. 1.

Referring now to FIG. 5, a node directed multicast traffic management method 500 using various embodiments of the systems and/or devices described herein is shown. For example, method 500 may be implemented utilizing the various embodiments of system 100, central server 102, rules-based engine 108, multicast daemon 110, and/or other devices and/or components. At block 502 the rules-based engine 108 generates one or more rules for each mesh node in a group of mesh nodes in one or more wireless mesh routes. At least one of these rules manages traffic in a multicast operation instructing the mesh node to change a pre-routing parameter in a packet header of a multicast IP packet received at a mesh node during the multicast operation. Additionally, at block 504, the multicast daemon 210 (e.g., see FIG. 2) may enter rules in the IP forwarding layer 230 of each mesh node, thus conveying the one or more rules to each mesh node in the group of mesh nodes.

Figure 6:
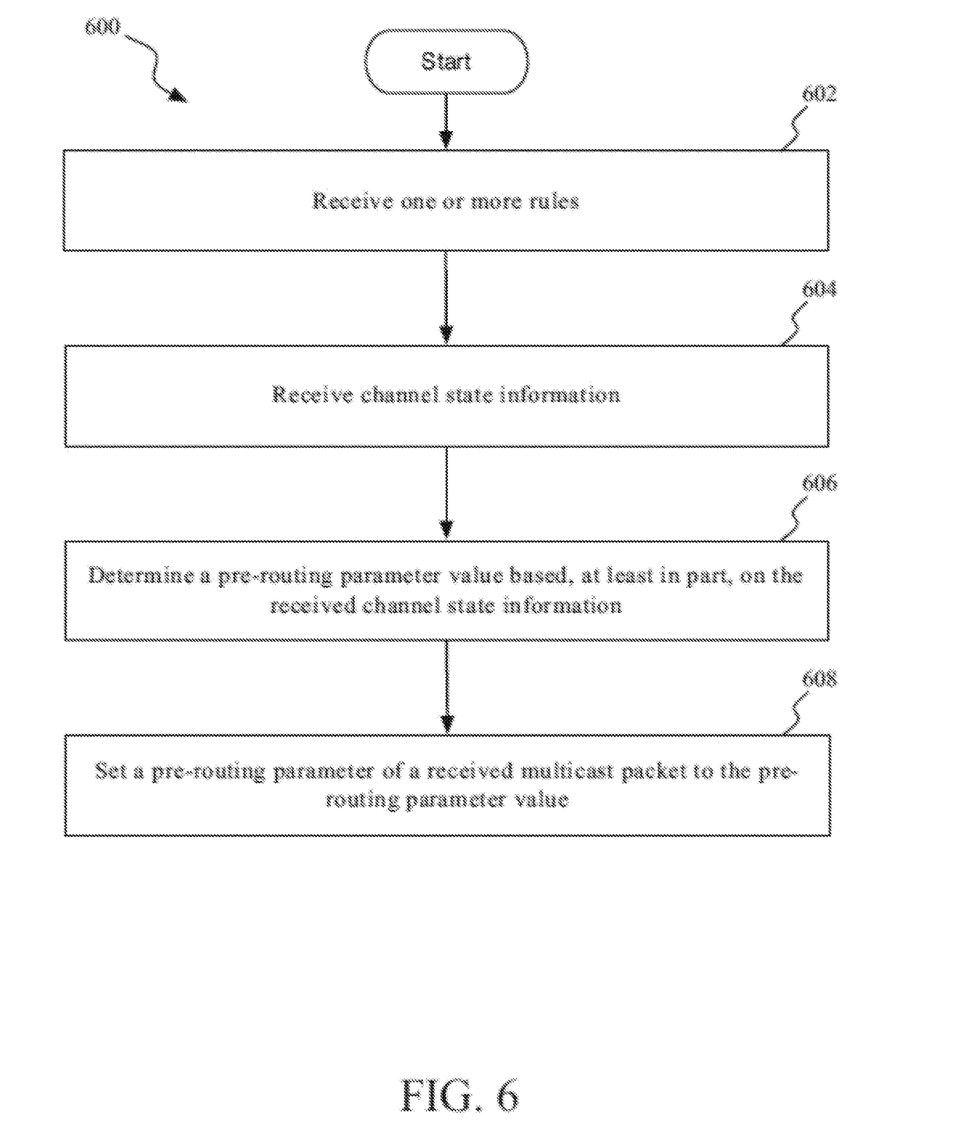
FIG. 6 is a flowchart of a method of multicast traffic management at a mesh node of the multicast traffic management system of FIG. 1.
Figure 7:
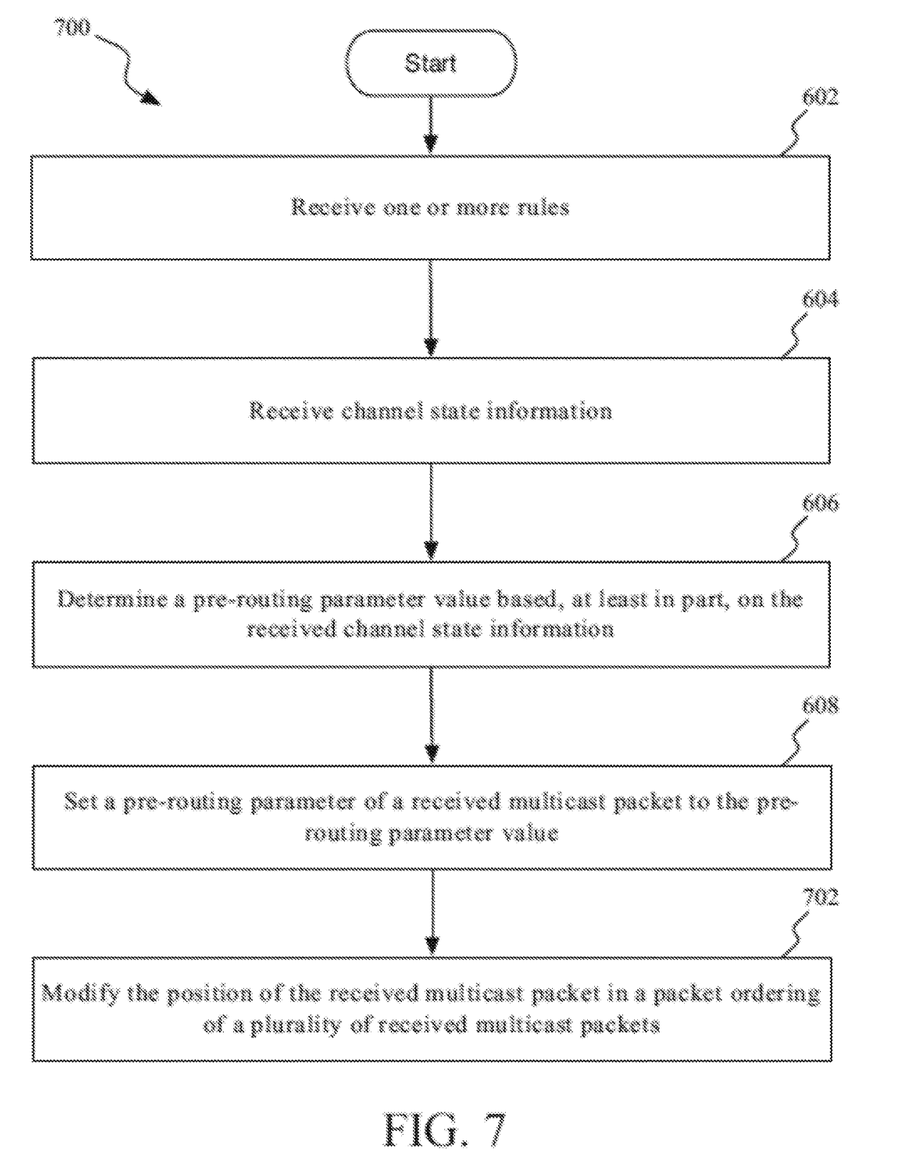
FIG. 7 is a flowchart of another method of multicast traffic management at a mesh node of the multicast traffic management system of FIG. 1.

Referring now to FIG. 6 and FIG. 7, a node directed multicast traffic management method 600 using various embodiments of the systems and/or devices described herein is shown. For example, method 600 may be implemented utilizing the various embodiments of system 100, central server 102, rules-based engine 108, multicast daemon 110, system 300, client station receiver 305, channel state detection engine 310, higher order packet encoding and decoding engine 315, rule insertion engine 320, and/or other devices and/or components. At block 602, mesh node receiver 305 receives one or more rules, such as, for example, a rule instructing the mesh node to adjust the TTL parameter based on the state of the channel. In some instances, these rules may be received in advance of a multicast flow. Alternatively, or in addition, these rules may be received as part of, or concurrently with, a multicast flow. At block 604, a mesh node receiver 305 (e.g., client station receiver) receives channel state information from the physical layer. Channel state information may be either statistical or instantaneous, and may include independent or combined data relating to, for example, scattering, fading, power decay with distance, and noise.

At block 606, the rule insertion engine 320 may determine a pre-routing parameter value, such as the TTL value, based, at least in part, on the received channel state information. For example, where a channel state, such as a pre-defined noise floor condition, is detected by the channel state detection engine 310 at the mesh node, a rule may be inserted by a rule insertion engine 320, such as, for example, a rule insertion engine that incorporates IPTABLES as part of the Netfilter kernel framework. For an IPTABLES implementation, a portion of the rule may have the following form:

iptables -t mangle -A PREROUTING -j TTL --ttl-inc 9

This increments the existing TTL value by "9", thus allowing the packet to traverse an additional 9 nodes. The noise floor may have risen beyond a rule insertion triggering threshold as a result of, for example, increased packet errors between a client station 104-*a* (e.g., mesh node) and server access point (e.g., central server 102-*a*; see FIG. 3).

At block 608, mechanisms in the OS packet processing stack 405, 410, 415, 420 may set a pre-routing parameter of a received multicast packet to the pre-routing parameter value determined at block 606. In certain implementations where, for example, the Netfilter architecture is deployed, the packet mangling table changes packet information, including setting the TTL value in the packet header before a routing decision is made, in accordance with one or more inserted rules. In some cases, the mangling table of the Netfilter framework is bound to one or more of the hooks of the Netfilter hook API.

Referring now to FIG. 7, at block 702, in some embodiments, the position of a multicast packet in a multicast packet ordering is modified, with the position of the packet being changed relative to other packets in the group. Rule insertion may be accomplished in a manner consistent with those discussed previously, but the packets may be re-ordered, and in some instances, decoded and encoded in the receive 425 and transmit 430 directions respectively at each mesh node. In some implementations, packets are encoded and decoded using a random linear network coding encoder and decoder 415. In some cases, the random linear network coding encoder and decoder 415 may implement proprietary random linear network coding algorithms and technologies such as those provide by Code On Technologies Inc.

According to another embodiment of the present disclosure, a selective TTL adjustment method may use the least CPU bandwidth on the local network processor. The ability to turn multicast flows on or off depending on network directives facilitates better use of network bandwidth. Local or remote storage devices may normally send SSDP packets to a multicast group address on which there could be many content subscribers. The local processor may act as a multicast soft-switch that programs the network interface module to dynamically change the TTL. The local processor may comprise a high performance forwarding engine, but with flow insertion and removals in the order of 100 per second may result in a degradation of performance of up to 7-10% if an efficient method is not in place. Instead of the normal way of removing the multicast group address, the only TTL is dropped from 128 to 0. The end result is flow re-insertion is faster, and flow removal is also faster. Instead of the typical 7-10% of local processor time, the usage with the technique described here 1%.

Figure 8:
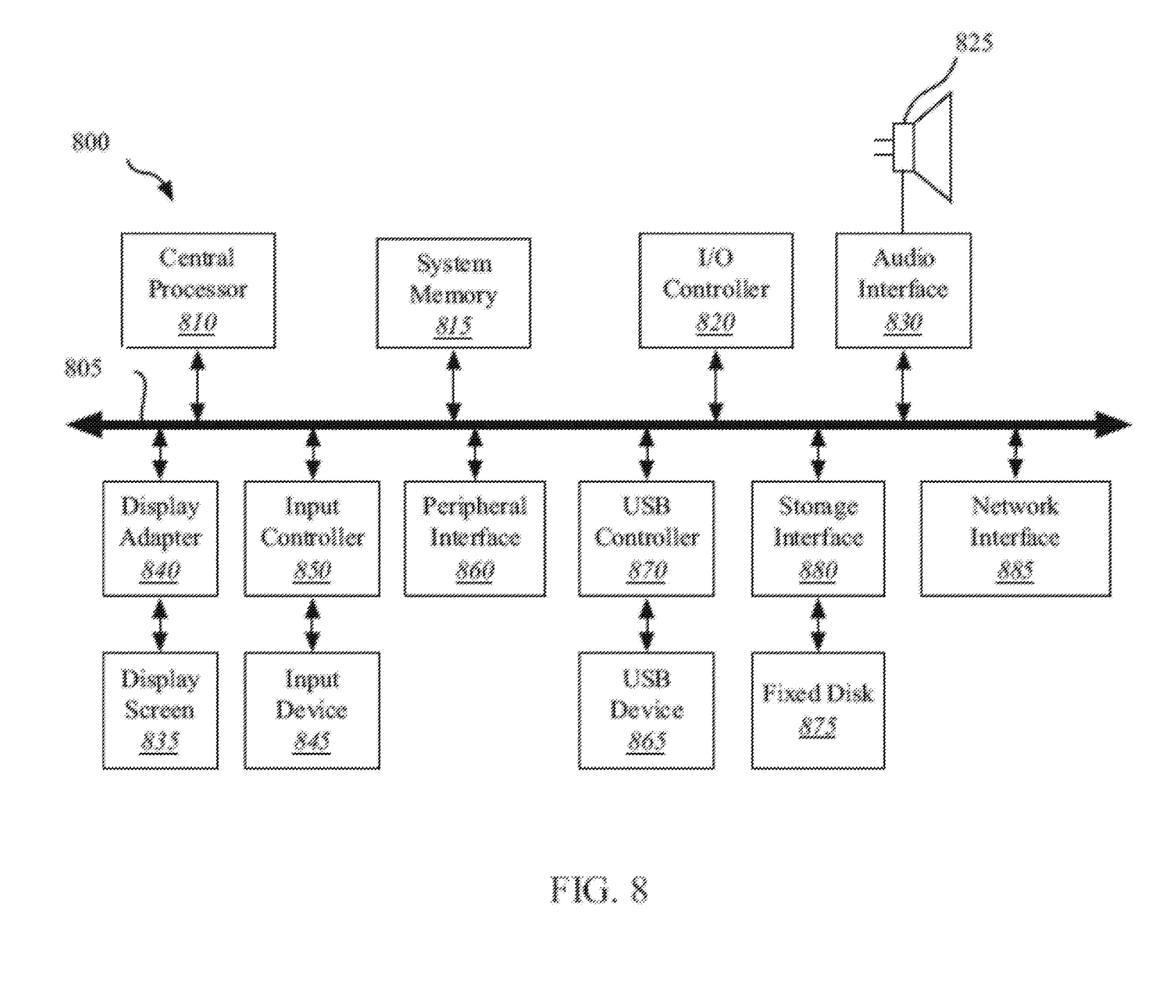
FIG. 8 is a block diagram of a computer system suitable for implementing the present systems and methods of FIGS. 1-7.

Referring now to FIG. 8, the computing device 800 may be an example of a central server 102 (e.g., see FIG. 1), a mesh node 104, or both. In one configuration, computing device 800 includes a bus 805 which interconnects major subsystems of computing device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one peripheral interface 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. Applications (e.g., IPTABLES 410, 420) resident with computing device 800 are generally stored on and accessed via a non-transitory computer readable medium, such as a hard disk drive (e.g., fixed disk 875) or other storage medium. Additionally, applications may be in the form of electronic signals modulated in accordance with the application and data communication technology when accessed via network interface 885.

Storage interface 880, as with the other storage interfaces of computing device 800, may connect to a standard computer readable medium for storage and/or retrieval of information, such as a fixed disk drive 875. Fixed disk drive 875 may be a part of computing device 800 or may be separate and accessed through other interface systems. Network interface 885 may provide a direct connection to a remote server via a direct network link to the Internet. Network interface 885 may provide such connection using wireless techniques, including digital cellular telephone connection, Cellular Digital Packet Data (CDPD) connection, digital satellite data connection, or the like.

Many other devices or subsystems (not shown) may be connected in a similar manner. Conversely, all of the devices shown in FIG. 8 need not be present to practice the present systems and methods. The devices and subsystems may be interconnected in different ways from that shown in FIG. 8. The aspect of some operations of a system such as that shown in FIG. 8 are readily known in the art and are not discussed in detail in this application. Computer instructions to implement the present disclosure may be stored in a non-transitory computer-readable medium such as one or more of system memory 815 or fixed disk 875. The operating system provided on computing device 800 may be, for example, iOS®, ANDROID®, MS-DOS®, MS-WINDOWS®, OS/2®, UNIX®, LINUX®, OSX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above-described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method at a server, comprising:
sensing traffic within a wireless mesh network, the wireless mesh network comprising a first mesh node associated with a first multicast flow and a second mesh node associated with a second multicast flow;

generating a first rule for the first mesh node and a second rule for the second mesh node based at least in part on the sensed traffic, the at least one rule based at least in part on channel state information, the channel state information being a state of a channel shared by the first multicast flow and the second multicast flow;

transmitting the first rule to the first mesh node and the second rule to the second mesh node, the transmission sent in a routing path based at least in part on the first rule and the second rule; and instructing the first mesh node and the second mesh node to change a pre-routing parameter during packet processing.

2. The method of claim 1, wherein the pre-routing parameter is associated with a multicast packet received at at least one mesh node.

3. The method of claim 2, wherein instructing the at least one mesh node to apply the at least one rule during packet processing further comprises instructing the change in the pre-routing parameter in a packet header of the multicast packet.

4. The method of claim 1, wherein instructing the first mesh node and the second mesh node to change the pre-routing parameter comprises instructing a change in a position of a multicast packet, the position of the multicast packet being modified relative to a plurality of received multicast packets.

5. The method of claim 1, further comprising:
determining at least one of a media producer or a media consumer.

6. The method of claim 5, wherein at least one rule is generated based at least in part on determining at least one of the media producer or the media consumer.

7. The method of claim 2, wherein the pre-routing parameter comprises a time-to-live (TTL) parameter.

8. The method of claim 7, wherein the at least one rule instructs the at least one mesh node to adjust the time-to-live (TTL) parameter within a wireless mesh route.

9. The method of claim 7, wherein the server and the at least one mesh node are included within the wireless mesh network.

10. An apparatus for multicast traffic management, comprising:
a processor;
memory in electronic communication with the processor; and
instructions stored in the memory and operable, when executed by the processor, to cause the apparatus to:
sense traffic within a wireless mesh network, the wireless mesh network comprising a first mesh node associated with a first multicast flow and a second mesh node associated with a second multicast flow;
generate a first rule for the first mesh node and a second rule for the second mesh node based at least in part on the sensed traffic, the at least one rule based at least in part on channel state information, the channel state information being a state of a channel shared by the first multicast flow and the second multicast flow;
transmit the first rule to the first mesh node and the second rule to the second mesh node, the transmission sent in a routing path based at least in part on the first rule and the second rule; and
instruct the first mesh node and the second mesh node to change a pre-routing parameter during packet processing.

11. The apparatus of claim 10, wherein the pre-routing parameter is associated with a multicast packet received at at least one mesh node.

12. The apparatus of claim 11, wherein instructing the at least one mesh node to apply the at least one rule during the packet processing further comprises instructing the change in the pre-routing parameter in a packet header of the multicast packet.

13. The apparatus of claim 10, wherein instructing the first mesh node and the second mesh node to change the pre-routing parameter comprises instructing a change in a position of a multicast packet, the position of the multicast packet being modified relative to a plurality of received multicast packets.

14. The apparatus of claim 10, wherein the instructions further cause the apparatus to:
recognize at least one of a media producer or a media consumer.

15. The apparatus of claim 14, wherein at least one rule is generated based at least in part on recognizing at least one of the media producer or the media consumer.

16. The apparatus of claim 11, wherein the pre-routing parameter comprises a time-to-live (TTL) parameter.

17. A non-transitory computer-readable medium storing computer-executable code for security and/or automation systems, the code executable by a processor to:
sense traffic within a wireless mesh network, the wireless mesh network comprising a first mesh node associated with a first multicast flow and a second mesh node associated with a second multicast flow;
generate a first rule for the first mesh node and a second rule for the second mesh node based at least in part on the sensed traffic, the at least one rule based at least in part on channel state information, the channel state information being a state of a channel shared by the first multicast flow and the second multicast flow;
transmit the first rule to the first mesh node and the second rule to the second mesh node, the transmission sent in a routing path based at least in part on the first rule and the second rule; and
instruct the first mesh node and the second mesh node to change a pre-routing parameter during packet processing.

18. The non-transitory computer-readable medium of claim 17, wherein the pre-routing parameter is associated with a multicast packet received at at least one mesh node.

19. The non-transitory computer-readable medium of claim 18, wherein the at least one rule is configured to instruct the change in the pre-routing parameter in a packet header of the multicast packet.

20. The non-transitory computer-readable medium of claim 17, wherein instructing the first mesh node and the second mesh node to change the pre-routing parameter comprises instructing a change in a position of a multicast packet, the position of the multicast packet being modified relative to a plurality of received multicast packets.

* * * * *